(12) United States Patent
Lim

(10) Patent No.: US 8,245,297 B2
(45) Date of Patent: Aug. 14, 2012

(54) COMPUTER SECURITY EVENT MANAGEMENT SYSTEM

(75) Inventor: Keng Leng Albert Lim, Tampines (SG)

(73) Assignee: E-Cop Pte. Ltd., Singapore (SG)

( * ) Notice: Subject to any disclaimer, the term of this patent is extended or adjusted under 35 U.S.C. 154(b) by 2658 days.

(21) Appl. No.: 10/488,657

(22) PCT Filed: Sep. 4, 2001

(86) PCT No.: PCT/SG01/00176
§ 371 (c)(1),
(2), (4) Date: Jul. 29, 2004

(87) PCT Pub. No.: WO03/021376
PCT Pub. Date: Mar. 13, 2003

(65) Prior Publication Data
US 2004/0250133 A1 Dec. 9, 2004

(51) Int. Cl.
*G08B 23/00* (2006.01)
*G06F 12/14* (2006.01)
(52) U.S. Cl. .......................................................... 726/23
(58) Field of Classification Search .................. 709/224; 726/23, 4
See application file for complete search history.

(56) References Cited

U.S. PATENT DOCUMENTS

| 5,832,518 A | 11/1998 | Mastors |
| 5,897,641 A | 4/1999 | Ruddy et al. |
| 6,092,087 A | 7/2000 | Mastors |
| 6,321,338 B1 * | 11/2001 | Porras et al. ..................... 726/25 |
| 6,353,385 B1 * | 3/2002 | Molini et al. .................. 340/506 |
| 2003/0037136 A1 * | 2/2003 | Labovitz et al. ............... 709/224 |
| 2003/0061506 A1 * | 3/2003 | Cooper et al. ................. 713/201 |

FOREIGN PATENT DOCUMENTS

GB 2354612 3/2001

OTHER PUBLICATIONS

Search Report from the Austrian Patent Office Service and Information Center regarding corresponding application 200401487-4.

* cited by examiner

*Primary Examiner* — William Powers
(74) *Attorney, Agent, or Firm* — Harness, Dickey & Pierce, P.L.C.

(57) ABSTRACT

A computer security event monitoring system comprising a trigger for generating a security event alert when a security event occurs and an event manager responsive to the generation of a security event alert. The alert is converted to an incident record by the event manager. The incident record is stored in a storage means and forwarded to an event reaction means for investigation of a reaction to the security event.

23 Claims, 6 Drawing Sheets

Level One:
Consist of IO (Input/Output) module

Level Two:
Consist of TS (Technology Specific) module

Level Three:
Consist of IE module and SXP module

Level Four:
Consist of ST (storage) module

COMPUTER SECURITY EVENT MANAGEMENT SYSTEM

FIELD OF THE INVENTION

The present invention relates to an event monitoring system for monitoring computer security events.

BACKGROUND OF THE INVENTION

Computer related security breaches are becoming more common. Just a few examples are denial of service attacks, viruses, worms and hacking. In addition the consequences and costs of security breaches and attacks is ever increasing. However, simply providing a firewall machine alone is insufficient. It is just as important to protect the computer system from backdoor entry and misuse by authorised personal. Furthermore, even with security products in place such as firewalls and instrusion detection systems, antivirus software and the like, these systems generate vast logs of data in a variety of formats that is not useful for macro analysis and often results in after the fact detection. This makes real time intervention difficult or impossible.

SUMMARY OF THE PRESENT INVENTION

The present invention seeks to provide a computer system monitoring and provides better security protection than existing systems.

According to the present invention there is provided a computer security event monitoring system comprising at least:

a trigger for generating a security event alert when a security event occurs; and an event manager responsive to the generation of a security event alert, wherein the alert is converted to an incident record, the incident record being stored in a storage means and forwarded to an event reaction means for instigation of a reaction to the security event.

Preferably a plurality of triggers are provided for generation of security event alerts, each trigger responsive to a different type of security event.

Preferably one form of trigger is an intrusion detection system. Preferably another form of trigger is a firewall software application.

Typically each trigger generates a security event alert in a different format and the event manager converts a plurality of formats of event alerts into a uniformly formatted incident record.

Preferably the event manager performs an assessment of the severity of the event alert and prioritises incident records accordingly. Preferably the assessment is made by checking the alert against one or more rules for determining severity. Preferably the assessment is made by checking the alert against one or more rules for determining a reaction to the security event that triggered the alert.

Preferably the event reaction means is remotely located.

Preferably the event manager is a software application running on a dedicated computer connected by a network to a computer system being monitored. In one embodiment the computer system is connected to the dedicated computer by a local area network. In another embodiment the computer system includes a plurality of computers connected by a wide area network. Alternatively the computer system is a plurality of computers connected by a global computer network.

According to another aspect of the present invention there is provided a method of computer security event monitoring including the steps of:

providing a trigger for generating a security alert;

providing an event manager responsive to the generation of a security alert;

generating a security alert when a security event occurs;

converting the alert into an incident record;

storing the incident record;

forwarding the incident record to an event reaction means; and instigating a reaction to the security event.

Preferably the security alert is generated by a trigger in the form of an intrusion detection system. Preferably the security alert is generated by a trigger in the form of a firewall software application.

Typically security event alerts are generated in a plurality of formats and the event manager converts the plurality of formats of event alerts into a single format incident record.

Preferably an assessment of the severity of the event alert is conducted to prioritise incident records accordingly. Preferably an assessment is conducted by checking the alert against one or more rules for determining the reaction to the security event that triggered the alert.

BRIEF DESCRIPTION OF THE DRAWINGS

In order to provide a better understanding, preferred embodiments of the present invention will now be described in detail, by way of example only, with reference to the accompanying drawings, in which:

Referring to FIG. 1 there is shown a computer security event monitoring system 10 that includes a plurality of triggers 12 that provide security event alerts to an event manager 14. The event manager 14 converts the event alerts to incident records and stores these in a database 16 as well as forwarding them to an event reaction means in the form of a global command centre console 18.

The triggers are in the form of an intrusion detection system, a firewall program, antivirus software, an application software and/or operating systems logs. Each of the triggers 12 are configured to send an alert to the event manager 14 if a security event occurs. A security event is an event that is a real or potential threat to the proper working and use of a computer system. For example, a firewall protecting a corporate network that suffers an Internet Control Message Protocol (ICMP) flood and registers a list of violations will trigger an alarm. An intrusion detection system that detects a string of commands targeted at a corporate mail server for the purpose of exploiting administrator access will trigger an alarm. Antivirus software residing on a file server that detects an unknown variant of a virus and is unable to cleanse the infected file will trigger an alarm. Operating systems, such as Windows NT or Unix, that have a login violation in the middle of the night will trigger an alarm. Security flaws can be causes by software defects (bugs), security holes, incorrect system setup or deliberate backdoor openings. A trigger is aimed at detecting poor security or security breaches by detecting misuse or patterns that indicates real or potential security problems. Sometimes, only a macro analysis will reveal a security problem.

The event manager receives event alerts from a distributed security monitoring environment and is able to analyse various forms of communication and in particular TCP/IP traffic such as raw TCP and UDP connections as well as other protocols such as SNMP, SMTP, HTIP, FTP and other application non-streaming protocols and non-application streaming protocols. These are converted into a uniform format referred to as transportable incident format (TIF) records that are stored in the database 16. Specific modules of the event manager may be installed depending on the computer systems requirements.

The TIF records may also be assessed to determine an appropriate reaction to the event that triggered the alert. A response may be based on standing orders provided by a set of rules. In more serious cases human intervention can be instigated to counteract a security breach. Thus real time continuous analysis of the security of a computer system can be monitored, thereby allowing the ability to provide a real time assessment defence/reaction to a security incident. Furthermore, storing alerts in a uniform format enables reporting capabilities, trend analysis, and vulnerability analysis of the recorded incidents.

Monitoring devices include firewalls that report rejected requests or an intrusion detection system (IDS) that monitors the activity of a computer network. Generally the firewalls and IDSs are configured to send alerts to the event manager by providing a directly resolvable IP address rather than relying on DNS resolution. This is done to prevent reliance on the DNS service and to reduce vulnerability in the system.

Figure 1:
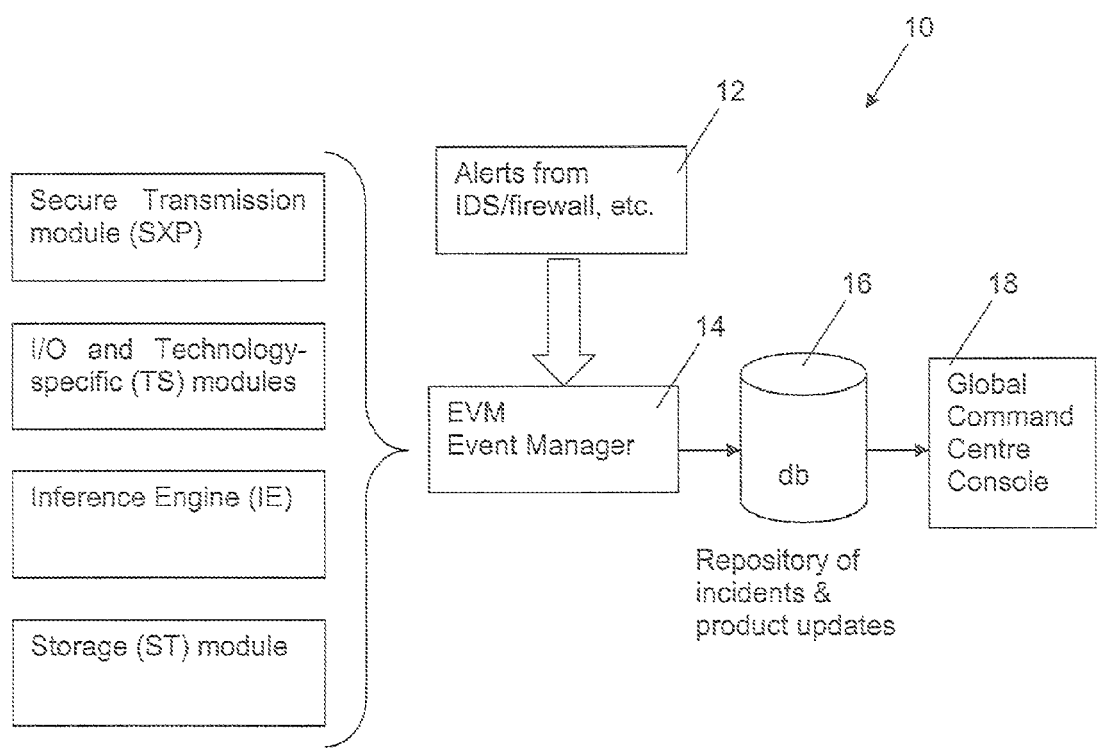
FIG. 1 is a schematic representation of a computer security event monitoring system in accordance with the present invention.
Figure 2:
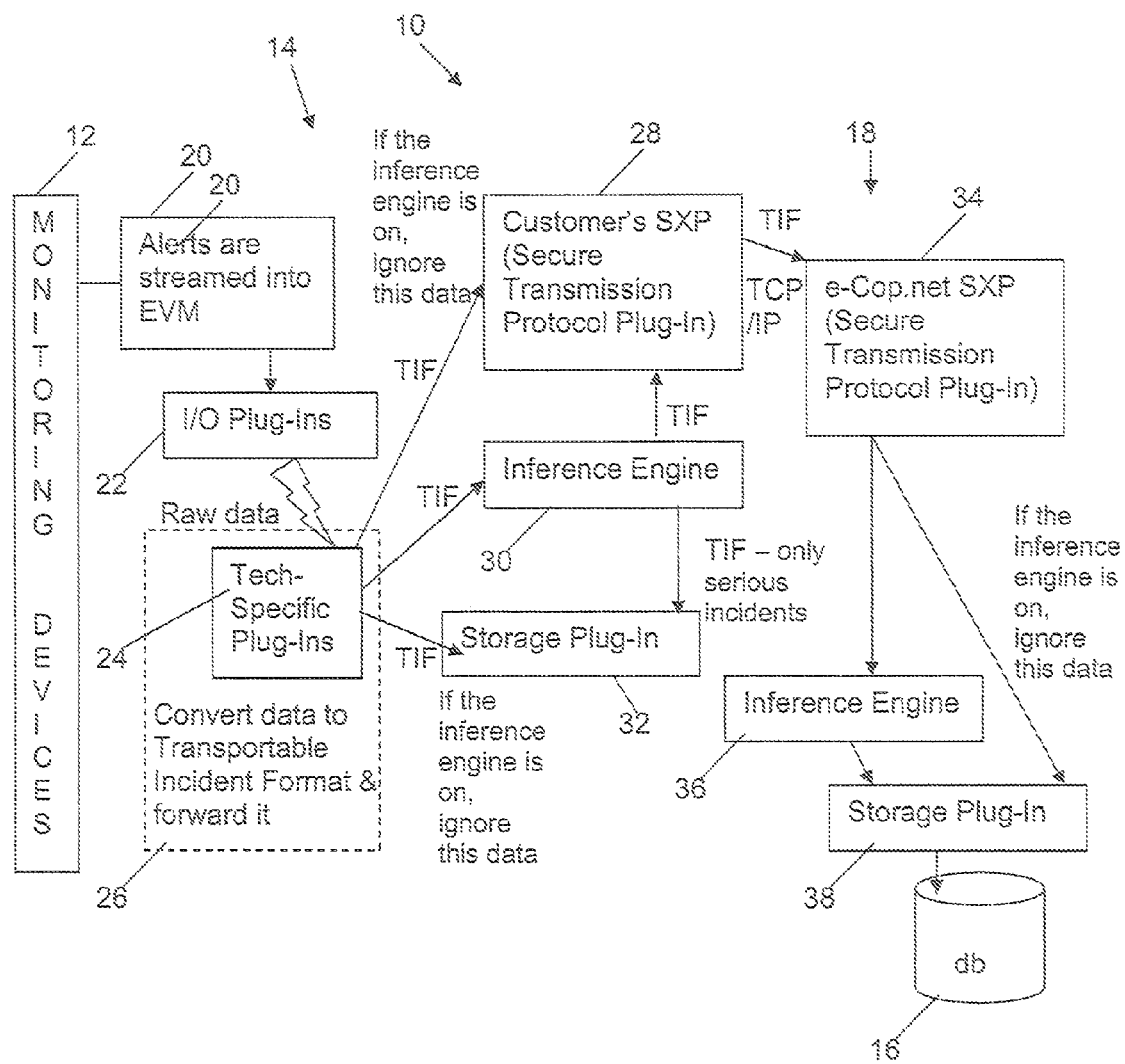
FIG. 2 is a schematic representation of an event manager of the system shown in FIG. 1.

Referring to FIG. 2, the event manager 14 receives alerts 20 from monitoring devices 12 (triggers). These alerts are streamed into input/output (I/O) plug-ins 22 that communicate with the monitoring devices. An alert from a technology specific monitoring device is received by each I/O plug-in 22, which forward the data to technology specific plug-ins 26. A technology specific plug-in 24 appropriate to the type of monitoring device interprets the data and converts it into TIF records. The plug-ins 26 then broadcast the TIF record.

The I/O and technology specific modules broadcast raw data and TIFs respectively, such that other modules can receive them, process them or ignore them as per their configuration.

There is a push/pull mechanism in this communication. The various modules push the data with only the module that is configured to process the specific data pulling the data, while other modules ignore the data. For example, the TIF data broadcast by the TS modules may be pulled by storage modules, or an inference engine module. When the inference engine is used then the storage module ignores the TS module broadcast and only pulls inference engine broadcasts.

Preferably, but optionally, an inference engine 30 is provided. If the inference engine 30 is provided, it receives the TIF record broadcast and forwards it to a secure transmission protocol (SXP) plug-in 28. The inference engine 30 also filters TIF records according to the degree of severity of the security event that triggered the alert, with only serious incidents being forwarded to a storage plug-in 32 for storage. The SXP plug-in 28 ignores TIF records broadcast by the plug-in 26 and only accepts TIF records broadcast by the inference engine 30. The storage plug-in 32 acts similarly.

If the inference engine 30 is not used, the SXP plug-in 28 receives the TIF records from the plug-ins 26. The storage plug-in 32 also receives the TIF records directly from the plug-ins 26.

The SXP plug-in 28 forwards the TIF record to a remote SPX plug-in 34 of the reaction means 18 by secure TCP/IP communication. Again it is preferred that an inference engine 34 be used at the reaction means 18. Again the inference engine 34 is able to act according to a set of rules to catergorise alerts with false alarms or low priority/severity alerts given less importance. Filtered TIF records are then provided to a storage plug-in 38. If the inference engine 36 is not used then unfiltered TIF records are provided to the storage plug-in 38. The storage plug-in 38 converts the TIF records into database storable format for storage in the database 16.

The reaction means 18 is configured to detect false alarms according to a computer system specific checklist. It is able to reject false alarms as requiring no action. If a real security event is detected a number of counter measures can be initiated. These include shutting of an IP port or blocking an intruder by adding the intruders IP address to the computer system's routers access control list. This will immediately block traffic from the IP address specified. In addition, collation and analysis of incidents can be conducted. Some security problems may only be detected by macro analysis.

Incident types can be defined according to the nature of the alert. Such alerts may includes probes, FTP application attacks or remote procedure call attack attempts. Multiple or repeated threats from the same IP source can be monitored and acted upon.

Incidents of over reaction to a false alarm are reduced with some low level security problems being placed under observation to see if further recurrences occur. An automated inference engine can deal with some security threats, but if the inference engine cannot handle a particular security situations then it may be escalated in priority to dealt with a consultant. The consultant may, for example, contact with a particular owner of a domain or ISP to deal with the incident.

Records of incidents stored in the database 16 can be analysed to provide a correlation of security incidents rather then multiple discrete alerts. A log of security incidents may be useful for forensic analysis in case law enforcement is required. In addition, the database 16 may be useful in profiling of security incidents.

The event manager 14 is provided in a modular design with four levels, each level having one or more plug-ins/modules. The event manager can be configured to operate in a distributed environment with a plurality of nodes, each node dedicated to perform a different function. One event manager node is set up as a master to distribute the load over various slave nodes.

Figure 3:
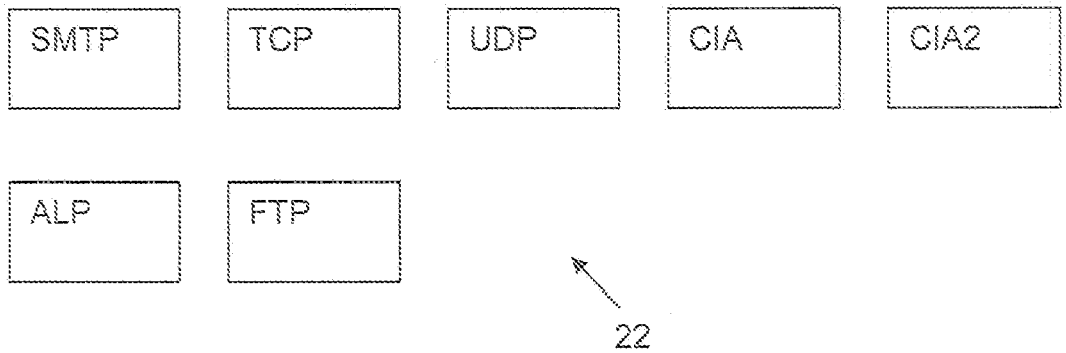
FIG. 3 is a schematic representation of a first level of the event manager of FIG. 2.

Referring to FIG. 3, the first layer of modules comprises input/output plug-ins 22 that receive data in various kinds of format including, but not limited to, SMTP, TCP, UDP, HTTP and FTP. Each module is dedicated to a particular input stream protocol. The plug-in removes the raw data and broadcasts it to technology specific modules 26 in the second layer. In addition there is an application layer proxy (ALP) module and a content integrity agent (CIA) module. The ALP module intercedes between host server and connecting clients and is capable of filtering out traffic (IP packets) based on a user defined wordlist (dictionary) or complex regular expression list. The ALP module operates at the highest network layer, namely the application layer. The monitoring and packet rejection hinges on a list of forbidden words which can be specified. The CIA protects publicly available data, such as a website, by exposing a monitored folder to public access and if tampered with, synchronises it with an insulated master folder.

Figure 4:
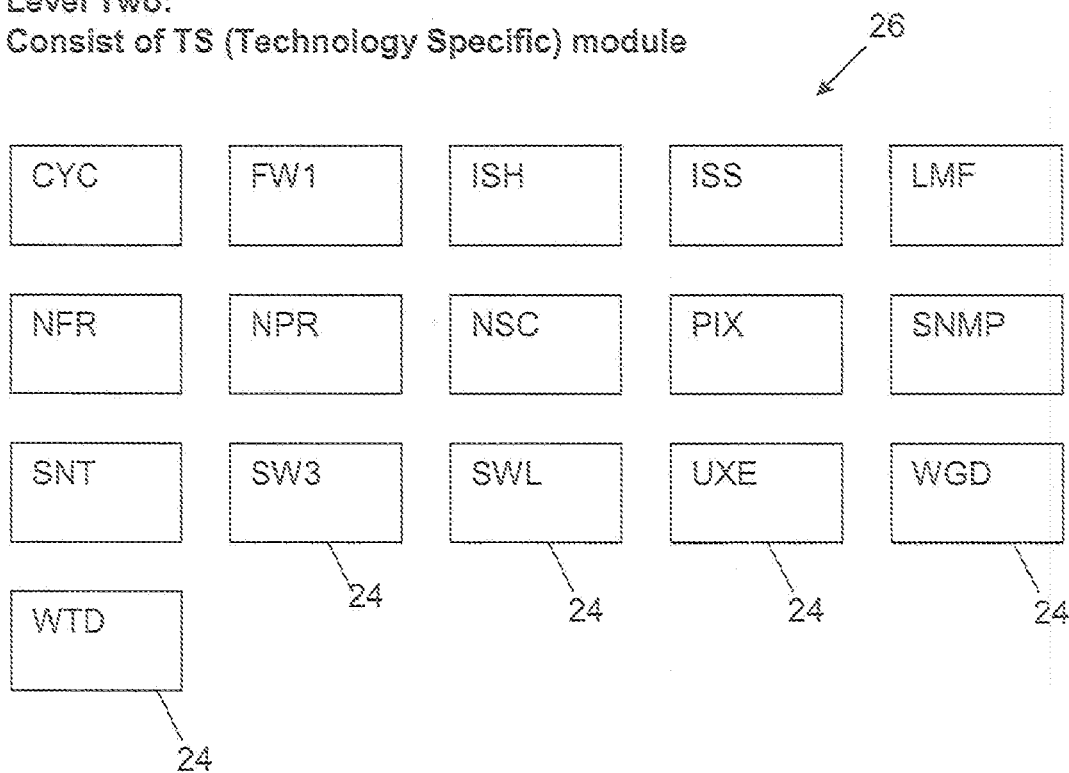
FIG. 4 is a schematic representation of a second level of the event manager of FIG. 2.

Referring to FIG. 4, a second technology specific (TS) module layer is shown including the TS plug-ins 26. Each TS modules 24 converts raw input (alerts) into transportable incident format and broadcasts it to the inference engine or SPX and storage modules.

Raw alerts mainly come from two types of device, these being firewalls and intrusion detection systems. When an I/O module receives alerts it broadcasts the alerts to all TS modules, which will listen at the same time. Each module takes the relevant alerts and ignores the rest of them. Thus all the modules collectively process the entire data.

Intrusion detection system (IDS) modules deal with alerts from various intrusion detection systems. Each TS module decodes and processes an alert from an IDS product or a firewall product of a particular software vendor. ISS decoder module processes alerts received from "ISS Real Secure". NFR decoder processes alerts from "Network Flight Recorder". SW3 decoder processes alerts from "CA Session Wall-3".

FW1 decoder process alerts from "Checkpoint Firewall 1". The net screen SMTP decoder processes alerts from "Net Screen Firewall". Raptor flight decoder processes alerts from "Raptor Firewall" for Windows NT or Sun Solaris. Sonic wall decoder processes alerts from "3 COM Sonic Wall". Watch guard SMTP decoder processes alerts from "Watch Guard Firebox". WebTrends SysLog decoder processes alerts from "Web Trends SysLog".

Figure 5:
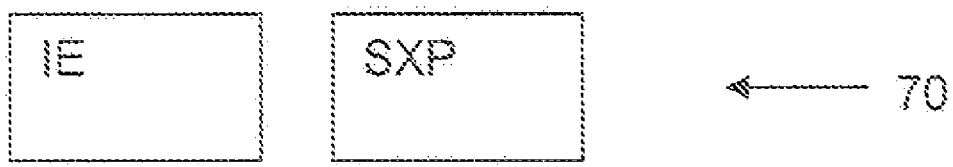
FIG. 5 is a schematic representation of a third level of the event manager of FIG. 2.

Referring to FIG. 5, a third level 70 of the event manager is shown. This includes the inference engine (IE). The IE performs a preliminary check on the data to determine whether the event should be logged or dropped based on a set of user defined rules. A basic inference engine outputs TIF data without altering it only removing unwanted alerts. Where an event manager is configured with an inference engine module, the TIF output from TS modules is ignored by storage and SXP modules. Only post inference engine TIF data (those only containing serious alerts) is accepted for processing by the storage or SXP modules. The SPX module transmits TIF records to the global command centre 18 database in an encrypted format, such as secure TCP.

Figure 6:
FIG. 6 is a schematic representation of a fourth level of the event manager of FIG. 2.

Referring to FIG. 6, a fourth layer 80 of the event manager is shown which includes a storage (SI) module that supports use of common databases for storing incidents. It converts processed TIF events into data specific format and is easily retrievable table in database, such as Microsoft SQL server.

General modules may be provided including a log master that logs all incoming traffic, if configured to do so, and a device health check module that automatically checks the status of other modules, and a device health check module that automatically checks the status of other modules.

Figure 7:
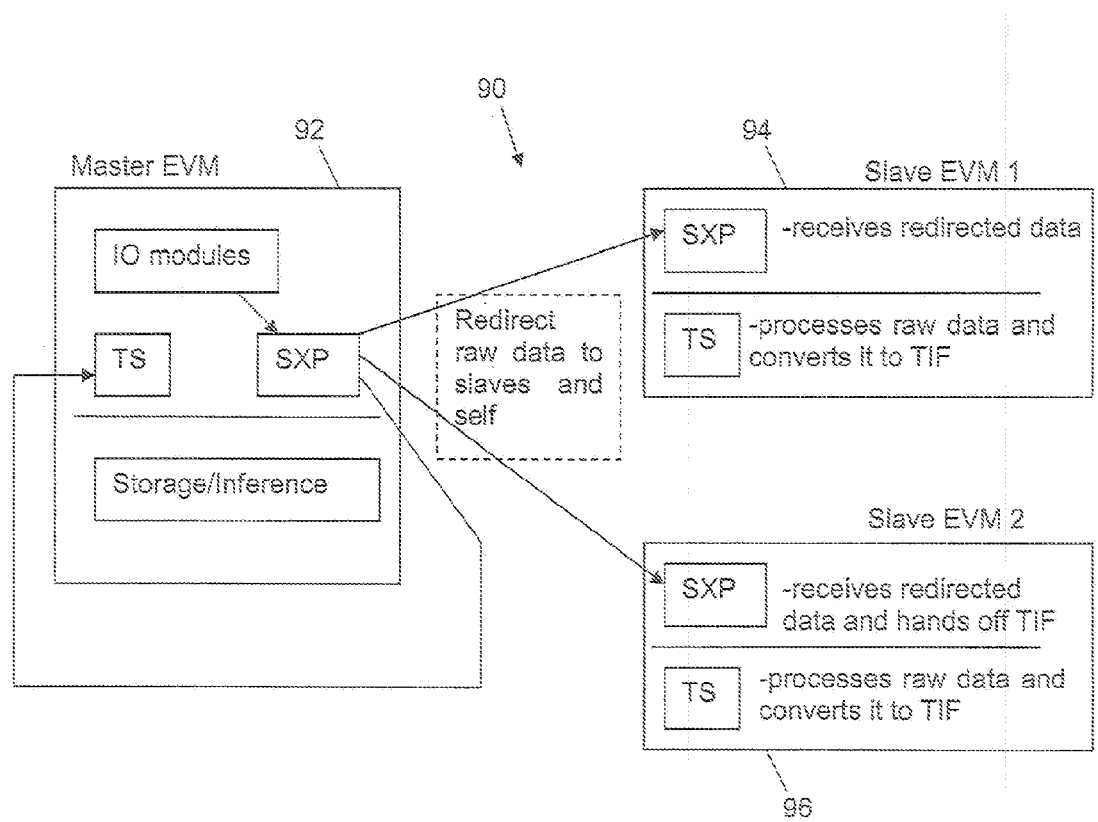
FIG. 7 is a schematic representation of a master slave relationship between a plurality of event managers.

Referring to FIG. 7, when a distributed event manager environment is used, as indicated by 90, one of the event managers 92 is configured as a master event manager. Other event managers 94 and 96 are configured as slave managers. The master event manager distributes raw data equally among slaves and the local TS module within itself. The TS modules only accept redirected raw data being broadcasted by I/O modules. The TS modules of the master and each of the slaves then completes processing of the raw data by converting all the data into TIF records which then may be handed off.

A handoff occurs by providing an IP addresses specifying machines to which incidents are to be forwarded. A handoff is useful where a client side event manager has limited processing such as of I/O and TS modules only. If SXP is configured to hand-off the processed incidents (TIF) to a designated global command centre event manager further processing and storage can be performed.

A re-direct can be provided that passes raw data without performing any processing so that raw data can be shared amongst several event managers. A re-direct is suitable for environments with a large amount of raw incidents, whereby a single event manager is insufficient. This is typically used in an event manager farm with a master and multiple slave event managers sharing the processing load.

The master event manager receives raw data incidents from the security devices through the I/O modules and transmits the incident to the machines listed under a re-direct list via the SXP module. All the event managers to which the data is re-directed are configured with exactly the same modules, typically, several technology specific modules. The decision of which event manager to transmit to is done fairly and equally. The master event manager keeps a journal of what has been transmitted to each event manager in the group and transmits the raw incidents to one which receive the least number of raw incidents. Upon receiving the data the event manager that data is redirected to processes the raw data, converting it into TIF records. TIF records may be further processed by an inference engine configured on the same event manager or may be stored in a repository by an ST module. They can also be handed off the another event manager module to, for example, be categorised by an inference engine.

Figure 8:
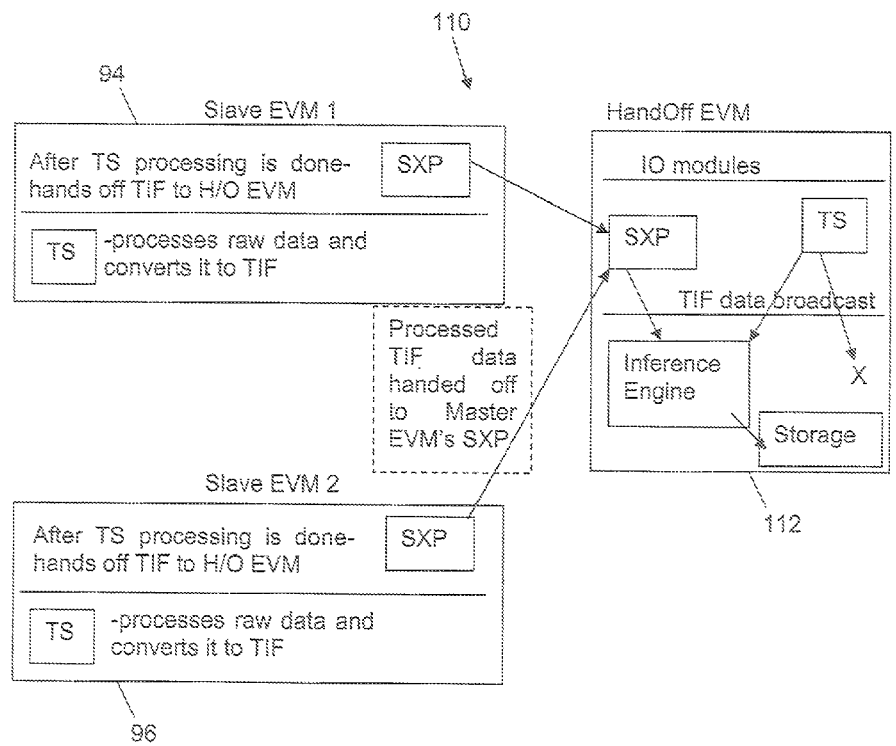
FIG. 8 is a schematic representation of a hand-off process between slave event managers.

Referring to FIG. 8, TIF data is handed off to a master event manager's SXP module. The TS module within the master broadcasts TIFs and the master passes all data to the storage module and inference engine. The hand-off event manager can be another slave attached to the master or the master itself. Alternatively there may be two hand-off IP address which could be the slave or the master. If the first hand-off fails then the second hand-off is attempted.

The skilled addressee will appreciate that the present invention has advantages over the prior art. The present invention allows security events to be dealt with in real time, as well as providing a means of analysis of security events for trend analysis, vulnerability analysis or forensic analysis in case law enforcement is required.

The skilled addressee will appreciate that modifications and variations can be made to the present invention without departing from the basic inventive concept. Such modifications may include various forms of security event triggering devices, different methodologies and rule sets for dealing with and prioritising incidents. The system may provide a local security system or the security system may be distributed or may be entirely remotely based. Such modifications are intended to fall within the scope of the present invention, the nature of which is to be determined from the foregoing description and appended claims.

The claims defining the invention are as follows:
1. A computer security event monitoring system comprising:
  two or more input/output (I/O) modules for receiving alerts in different respective input stream protocols from one or more monitoring devices and for removing raw data from each alert; and
  one or more technology specific (TS) modules for receiving the raw data via broadcasting from the I/O modules and for converting raw data relevant to the respective TS modules into incident records in a uniform format.

2. A computer security event monitoring system according to claim 1, wherein the monitoring devices are provided for generation of the alerts, each monitoring device responsive to a different type of security event.

3. A computer security event monitoring system according to claim 2, wherein one form of the monitoring devices is an intrusion detection system.

4. A computer security event monitoring system according to claim 2, wherein one form of the monitoring devices is a firewall.

5. A computer security event monitoring system according to claim 1, further comprising a reaction means for performing an assessment of the severity of the alerts and for prioritizing the incident records in a uniform format accordingly.

6. A computer security event monitoring system according to claim 5, wherein the assessment is made by checking the alert against one or more rules for determining severity.

7. A computer security event monitoring system according to claim 5, wherein the assessment is made by checking the alert against one or more rules for determining a reaction to respective security events that triggered the alerts.

8. A computer security event monitoring system according to claim 5, wherein the reaction means is remotely located.

9. A computer security event monitoring system according to claim 1, further comprising a standalone local security system coupled to a system to be monitored.

10. A computer security event monitoring system according to claim 1, further comprising a distributed security system coupled to one or more systems to be monitored, wherein one or more components of the distributed security system are distributed remotely.

11. A computer security event monitoring system according to claim 1, further comprising a distributed security system coupled to one or more systems to be monitored, wherein all components of the distributed security system are distributed remotely.

12. A computer security event monitoring system according to claim 1, further comprising:
a master event manager for containing the I/O modules and at least one of the TS modules;
one or more slave event managers for containing at least one of the TS modules;
wherein the master event manager executes removal of raw data from each alert and distributes the raw data among the TS modules of the master event manager and the slave event managers via the broadcasting from the I/O modules.

13. A computer security event monitoring system according to claim 12, wherein the TS modules convert raw data relevant to the respective TS modules into incident records in the uniform format and the incident records are forwarded to another site in a handoff process.

14. A computer security event monitoring system according to claim 12, wherein the raw data distributed to the TS modules of the slave event managers are re-directed among the master event manager and the slave event managers.

15. A method of computer security event monitoring including the steps of:
providing two or more input/output (I/O) modules for receiving alerts in different respective input stream protocols from one or more monitoring devices and for removing raw data from each alert; and
providing one or more technology specific (TS) modules for receiving the raw data via broadcasting from the I/O modules and for converting raw data relevant to the respective TS modules into incident records in a uniform format.

16. A method of computer security event monitoring according to claim 15, wherein the alerts are generated by a monitoring device in the form of an intrusion detection system.

17. A method of computer security event monitoring according to claim 15, wherein the alerts are generated by a monitoring device in the form of a firewall software application.

18. A method of computer security event monitoring according to claim 15, wherein the alerts are generated in a plurality of formats.

19. A method of computer security event monitoring according to claim 15, further comprising providing a reaction means for performing an assessment of the severity of the alerts and for prioritizing the incident records in a uniform format accordingly.

20. A method of computer security event monitoring according to claim 15, wherein the assessment is conducted by checking the alerts against one or more rules for determining a reaction to the alerts.

21. A method of computer security event monitoring according to claim 15, further comprising:
providing a master event manager for containing the I/O modules and at least one of the TS modules;
providing one or more slave event managers for containing at least one of the TS modules;
wherein the master event manager executes removal of raw data from each alert and distributes the raw data among the TS modules of the master event manager and the slave event managers via the broadcasting from the I/O modules.

22. A method of computer security event monitoring according to claim 21, wherein the TS modules convert raw data relevant to the respective TS modules into incident records in the uniform format and the incident records are forwarded to another site in a handoff process.

23. A method of computer security event monitoring according to claim 21, wherein the raw data distributed to the TS modules of the slave event managers are re-directed among the master event manager and the slave event managers.

* * * * *